United States Patent
Espinosa et al.

(10) Patent No.: US 11,509,636 B2
(45) Date of Patent: Nov. 22, 2022

(54) USER AND DEVICE ONBOARDING

(71) Applicant: Corlina, Inc., Menlo Park, CA (US)

(72) Inventors: Antonio J. Espinosa, Menlo Park, CA (US); Shashi Sastry, Menlo Park, CA (US); Vincent Bemmel, Menlo Park, CA (US); Sameer Merchant, Menlo Park, CA (US)

(73) Assignee: Corlina, Inc., Menlo Park, CA (US)

( * ) Notice: Subject to any disclaimer, the term of this patent is extended or adjusted under 35 U.S.C. 154(b) by 477 days.

(21) Appl. No.: 16/262,430

(22) Filed: Jan. 30, 2019

(65) Prior Publication Data

US 2019/0238520 A1    Aug. 1, 2019

Related U.S. Application Data

(60) Provisional application No. 62/639,813, filed on Mar. 7, 2018, provisional application No. 62/623,838, filed on Jan. 30, 2018.

(51) Int. Cl.
*H04L 9/40* (2022.01)
*H04L 9/32* (2006.01)
(Continued)

(52) U.S. Cl.
CPC ............ *H04L 63/0442* (2013.01); *G06F 8/61* (2013.01); *H04L 9/0825* (2013.01);
(Continued)

(58) Field of Classification Search
CPC . H04L 63/0442; H04L 9/0825; H04L 9/3228; H04L 9/3263; H04L 63/0823;
(Continued)

(56) References Cited

U.S. PATENT DOCUMENTS 6,892,308 B1 * 5/2005 Medvinsky ......... H04L 63/0807
                                                    380/278
9,961,096 B1    5/2018 Pierce
(Continued)

FOREIGN PATENT DOCUMENTS

WO    WO 2016/178127 A1    11/2016

OTHER PUBLICATIONS

U.S. Appl. No. 16/119,357, Final Office Action dated Jan. 15, 2021.
(Continued)

*Primary Examiner* — Taghi T Arani
*Assistant Examiner* — Joshua Raymond White
(74) *Attorney, Agent, or Firm* — Alston & Bird LLP

(57) ABSTRACT

Various embodiments are directed to a system and method for establishing a secure communication pathway between a network-connected device and a computing platform. Such configurations encompass encrypting a device-specific installation package passed to the device using a device-generated cryptography key, verifying the identity of the computing platform at the device, encrypting a response message via a platform-generated cryptography key, transmitting the response message to the computing platform, verifying characteristics of the device via the response message, and establishing a secure communication platform upon verification of the device.

13 Claims, 7 Drawing Sheets

(51) Int. Cl.
*H04L 9/08* (2006.01)
*G06F 8/61* (2018.01)
*H04L 67/00* (2022.01)
*H04L 67/12* (2022.01)

(52) U.S. Cl.
CPC .......... *H04L 9/3228* (2013.01); *H04L 9/3263* (2013.01); *H04L 63/0823* (2013.01); *H04L 63/123* (2013.01); *H04L 67/34* (2013.01); *H04L 63/168* (2013.01); *H04L 67/12* (2013.01); *H04L 2209/64* (2013.01)

(58) Field of Classification Search
CPC ..... H04L 63/123; H04L 67/34; H04L 63/168; H04L 2209/64; G06F 8/61
See application file for complete search history.

(56) References Cited

U.S. PATENT DOCUMENTS

| | | | |
|---|---|---|---|
| 10,057,264 | B1 | 8/2018 | ElNakib et al. |
| 10,867,055 | B2 | 12/2020 | Espinosa et al. |
| 11,170,119 | B2 | 11/2021 | Espinosa et al. |
| 11,256,818 | B2 | 2/2022 | Bemmel et al. |
| 2002/0059144 | A1 | 5/2002 | Meffert et al. |
| 2005/0044478 | A1 | 2/2005 | Ali et al. |
| 2005/0069136 | A1 | 3/2005 | Thornton et al. |
| 2006/0245590 | A1 | 11/2006 | Brickell |
| 2010/0042835 | A1* | 2/2010 | Lee ................. H04W 12/065 713/168 |
| 2010/0115269 | A1* | 5/2010 | Allen ................. G06F 21/51 713/157 |
| 2012/0102317 | A1 | 4/2012 | Mathur et al. |
| 2013/0080197 | A1 | 3/2013 | Kung et al. |
| 2015/0121070 | A1* | 4/2015 | Lau ................. G06F 21/572 713/189 |
| 2015/0163121 | A1 | 6/2015 | Mahaffey et al. |
| 2015/0350228 | A1 | 12/2015 | Baxley et al. |
| 2015/0363607 | A1 | 12/2015 | Yang et al. |
| 2016/0098561 | A1 | 4/2016 | Keller et al. |
| 2016/0105292 | A1 | 4/2016 | Choi et al. |
| 2016/0210450 | A1 | 7/2016 | Su |
| 2016/0212099 | A1 | 7/2016 | Zou et al. |
| 2016/0261465 | A1 | 9/2016 | Gupta et al. |
| 2016/0300049 | A1 | 10/2016 | Guedalia et al. |
| 2017/0011298 | A1 | 1/2017 | Pal et al. |
| 2017/0006381 | A1 | 3/2017 | Bruce et al. |
| 2017/0078435 | A1 | 3/2017 | Babol et al. |
| 2017/0093585 | A1* | 3/2017 | Lee ................. H04L 9/14 |
| 2017/0111177 | A1* | 4/2017 | Oguma ................. H04L 67/12 |
| 2017/0126718 | A1 | 5/2017 | Baradaran et al. |
| 2017/0134415 | A1 | 5/2017 | Muddu et al. |
| 2017/0149813 | A1 | 5/2017 | Wright et al. |
| 2017/0171314 | A1 | 6/2017 | Britt |
| 2017/0232300 | A1 | 8/2017 | Tran et al. |
| 2017/0249235 | A1 | 8/2017 | Staples et al. |
| 2017/0295195 | A1 | 10/2017 | Wettstein et al. |
| 2017/0302663 | A1 | 10/2017 | Nainar et al. |
| 2017/0339178 | A1 | 11/2017 | Mahaffey et al. |
| 2017/0359417 | A1 | 12/2017 | Chen et al. |
| 2018/0097639 | A1 | 4/2018 | Gulati |
| 2018/0144139 | A1 | 5/2018 | Chen et al. |
| 2018/0181091 | A1 | 6/2018 | Funk et al. |
| 2018/0260562 | A1 | 9/2018 | Chen et al. |
| 2018/0285555 | A1* | 10/2018 | Dong ................. H04L 9/0894 |
| 2018/0332065 | A1 | 11/2018 | Gupta et al. |
| 2018/0367573 | A1 | 12/2018 | Ouyang |
| 2019/0081961 | A1 | 3/2019 | Bansal |
| 2019/0098028 | A1 | 3/2019 | Ektare et al. |
| 2019/0138716 | A1 | 5/2019 | Huang et al. |
| 2019/0156041 | A1 | 5/2019 | Levy |
| 2019/0205552 | A1 | 7/2019 | Espinosa et al. |
| 2019/0207957 | A1 | 7/2019 | Espinosa et al. |
| 2019/0207965 | A1 | 7/2019 | Espinosa et al. |
| 2019/0306698 | A1* | 10/2019 | Goto ................. H04W 12/50 |
| 2019/0312902 | A1 | 10/2019 | Wettstein et al. |
| 2020/0007342 | A1 | 1/2020 | Liem et al. |
| 2020/0211721 | A1 | 7/2020 | Ochoa et al. |
| 2022/0138333 | A1 | 5/2022 | Bemmel et al. |

OTHER PUBLICATIONS

PCT/US2018/067952 International Search Report and Written Opinion of the International Searching Authority dated Mar. 21, 2019.
PCT/US2018/67837 International Search Report and Written Opinion of the International Searching Authority dated Mar. 11, 2019.
PCT/US2018/67848 International Search Report and Written Opinion of the International Searching Authority dated Feb. 28, 2019.
PCT/US2019/015854 International Search Report and Written Opinion of the International Searching Authority dated Apr. 29, 2019.
U.S. Appl. No. 16/119,269, Notice of Allowance dated Sep. 3, 2020.
U.S. Appl. No. 16/119,357, Non-Final Office Action dated Aug. 25, 2020.
U.S. Appl. No. 16/119,357, Non-Final Office Action dated May 12, 2021.
U.S. Appl. No. 16/236,170, Final Office Action dated Mar. 3, 2021.
U.S. Appl. No. 16/236,170, Notice of Allowance and Interview Summary dated Jul. 8, 2021.
U.S. Appl. No. 16/119,357, Notice of Allowance and interview Summary dated Oct. 14, 2021.

* cited by examiner

USER AND DEVICE ONBOARDING

CROSS-REFERENCE TO RELATED APPLICATIONS

The present application claims priority to U.S. Provisional Appl. No. 62/623,838, filed on Jan. 30, 2018 and U.S. Provisional Appl. No. 62/639,813, filed on Mar. 7, 2018, both of which are incorporated herein by reference in their entirety.

FIELD

The present invention is related to support of connected cyber-physical systems, and more particularly to a system and method for onboarding of such systems.

BACKGROUND

The Internet-of-Things (IoT) has introduced a new paradigm of distributed sensors and actuators that are embedded in industrial systems, and connected via industrial IoT network. The key benefits of this include a high granularity of embedded sensor points that add critical real time visibility to the behavior of the factory systems. This enables modern systems to scale to automated, self-aware, just in time factories.

The current trend of automation and data exchange in manufacturing is often referred to as Industrie 4.0 or Factory of the Future. The Industrie 4.0 evolution leverages digital transformation and is characterized by four stages of visibility, transparency, predictive capacity, and adaptability. Real-time visibility is an essential step for the evolution to self-aware Industrial IoT (IIoT) systems.

The network has become a critical part of modern manufacturing systems. Modern factory applications typically put higher demands on these networks as they support higher load demands that directly impact operations' performance.

The development, manufacturing, installation and operation of an IIoT typically involves multiple organizations. The device and artifacts (application software and OS) installed on the device can be compromised at any stage during the devices lifetime. A person can replace any component of the device during its manufacturing installation or operations stages.

BRIEF SUMMARY

Certain embodiments are directed to a computing platform for establishing a secure communication pathway with a device. In various embodiments, the computing platform comprises: one or more memory storage areas; and one or more processors collectively configured to: receive device data comprising a unique machine identifier corresponding to the device and a first public cryptography key generated by the device; and generate a device-specific installation package comprising: a second public cryptography key generated by the one or more processors as a part of a second public-private cryptography key pair; the unique machine identifier; and a device agent; an executable installation script configured to cause the device to install the device agent and to initiate a secure communication connection between the device and the computing platform by passing a message encrypted with the second public cryptography key back to the computing platform; encrypt the device-specific installation package via the first public cryptography key; provide the device-specific installation package to the device; and establish a secure communication pathway with the device upon receipt of the encrypted message from the device.

In certain embodiments, establishing a secure communication pathway comprises: decrypting the encrypted message received from the device using a private cryptography key of the second public-private cryptography key pair; and upon verifying contents of the encrypted message received from the device, establishing the secure communication pathway. Moreover, receiving device data may comprise receiving manual input provided by a user via a platform dashboard user interface. In various embodiments, receiving device data comprises receiving device data correlated with an untrusted device; and establishing a secure communication pathway with the device converts the untrusted device into a trusted device. In certain embodiments, providing the device-specific installation package to the device comprises: generating a device-specific URI accessible by the device via a network; and pointing the device-specific URI to a download script causing the device to download the device-specific installation package upon accessing the device-specific URI.

In certain embodiments, the device-specific installation package further comprises a one-time use nounce; and wherein establishing a secure communication pathway with the device comprises: comparing a nounce value included within the encrypted message received from the device against the one-time use nounce included within the device-specific installation package; upon determining a match between the nounce value and the one-time use nounce, establish the secure communication pathway with the device and invalidate the one-time use nounce.

According to various embodiments, the one or more processors are further configured to generate a self-signed platform certificate for the device; and wherein the device-specific installation package further comprises the self-signed platform certificate for validating the identity of the computing platform at the network-connected device. Moreover, generating the device-specific installation package may further comprise determining whether the device is capable of maintaining a trusted connection between the monitoring agent and the computing platform.

Certain embodiments are directed to a computer-implemented method for establishing a secure communication pathway between a device and a computing platform. The method may comprise: receiving device data comprising a unique machine identifier corresponding to the device and a first public cryptography key generated by the device; generating a second public-private cryptography key pair comprising a second public cryptography key; and generating a device-specific installation package comprising: the second public cryptography key; the unique machine identifier; and a device agent; an executable installation script configured to cause the device to install the device agent and to initiate a secure communication connection between the device and the computing platform by passing a message encrypted with the second public cryptography key back to the computing platform; encrypting the device-specific installation package via the first public cryptography key; providing the device-specific installation package to the device; and establishing a secure communication pathway with the device upon receipt of the encrypted message from the device.

In various embodiments, establishing a secure communication pathway comprises: decrypting the encrypted message received from the device using a private cryptography key of the second public-private cryptography key pair; and upon verifying contents of the encrypted message received from the device, establishing the secure communication pathway.

In certain embodiments, receiving device data comprises receiving manual input provided by a user via a platform dashboard. In various embodiments, receiving device data comprises receiving device data correlated with an untrusted device; and wherein establishing a secure communication pathway with the device converts the untrusted device into a trusted device. Moreover, providing the device-specific installation package to the device may comprise: generating a device-specific URI accessible by the device via a network; and pointing the device-specific URI to a download script causing the device to download the device-specific installation package upon accessing the device-specific URI.

In certain embodiments, the device-specific installation package further comprises a one-time use nounce; and wherein establishing a secure communication pathway with the device comprises: comparing a nounce value included within the encrypted message received from the device against the one-time use nounce included within the device-specific installation package; upon determining a match between the nounce value and the one-time use nounce, establish the secure communication pathway with the device and invalidate the one-time use nounce. Moreover, the method may further comprise steps for generating a self-signed platform certificate for the device; and wherein the device-specific installation package further comprises the self-signed platform certificate.

Certain embodiments are directed to a network-connected device configured for establishing a secure communication pathway with a computing platform. In various embodiments, the network-connected device comprises: one or more memory storage areas; and one or more processors collectively configured to: generate a first public-private cryptography key pair comprising a first public key and a first private key, wherein the first public key is provided to the computing platform; receive a device-specific installation package from the computing platform, wherein the device-specific installation package is encrypted with the first public key and wherein the device-specific installation package comprises: a second public cryptography key generated by the computing platform; a device agent; and an executable installation script configured to install the device agent on the network-connected device; decrypt the device-specific installation package using the first private key; execute the installation script to install the device agent onto the network-connected device; generate an encrypted message based at least in part on the second public cryptography key; transmit the encrypted message to the computing platform; and establish a secure communication pathway with the computing platform.

In various embodiments, the device-specific installation package further comprises a self-signed platform certificate generated at the computing platform; and wherein the one or more processors are further configured to verify the self-signed platform certificate before executing the installation script. Moreover, the device-specific installation package may further comprise a randomly generated nounce, and wherein generating an encrypted message comprises generating a message comprising a nounce value matching the randomly generated nounce included within the device-specific installation package.

In various embodiments, receiving the device-specific installation package comprises querying a device-specific URI available via a network; and executing a download script accessible via the device-specific URI to download the device-specific installation package. In certain embodiments, the one or more processors are further configured to: execute the device agent to monitor activity of the network-connected device; and transmit data indicative of monitored activity to the computing platform via the secure communication pathway.

BRIEF DESCRIPTION OF THE SEVERAL VIEWS OF THE DRAWINGS

Reference will now be made to the accompanying drawings, which are not necessarily drawn to scale, and wherein.

DETAILED DESCRIPTION

Figure 1:
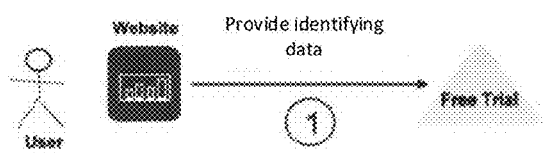
FIGS. 1-6 show various portions of a workflow for onboarding a device in accordance with one embodiment.

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

Due to the increasing risk of IoT device tampering, observations made and collected by an IoT device may only be trusted to the extent to which the device itself, and any associated network connections, may be trusted. If an IoT device has been compromised, the observations provided by the IoT device can wreak havoc within a connected system, such as a connected manufacturing system. In order to establish trust on observations made by an IoT device, it is essential to monitor the device and its associated environment (which may encompass sensors attached to the device) by a trusted agent. Certain embodiments, as well as agents provided in accordance with certain embodiments provide such trust assurance of IoT devices through device-installed monitoring agents and SaaS platform configurations. However, traditional processes of installing software onto IoT devices opens each device to potential unauthorized access to the device—thereby rendering the device completely untrustworthy, regardless of whether any monitoring is performed with the device. The act of installing an agent and establishing trust with a SaaS platform is referred to in terms of industry parlance as 'on-boarding' of an IoT device. Various embodiments provide completely secure IoT device onboarding processes that prevent unauthorized access to the device at the time of installation of a device-monitoring agent on the IoT device. In other words, various embodiments are configured for introducing an IoT device (or various other computing devices) to a trusted, secure ecosystem encompassing a connected network of entirely trusted devices. These devices may originate as normal "off-the-shelf" computing devices lacking trustable attributes, however though the configurations described herein, these otherwise "untrustworthy" devices may be introduced to the trusted ecosystem and so that these devices are rendered trustworthy after completion of the onboarding process. Subsequent monitoring of device characteristics through an installed monitoring agent (which may be installed after manufacturing of the device itself) may be considered entirely trustworthy, and usable for maintaining an accurate understanding of the operation of the device itself. Methods and configurations according to certain embodiments provide on-boarding processes for:

Validating the identity of a device on which a monitoring agent is to be downloaded and installed Ensuring the monitoring agent has not been compromised during installation Establishing a secured connection with the monitoring SaaS platform and verifies the identity of the monitoring SaaS platform.

Various embodiments, which provide the above-mentioned features, provide a solution that is robust to:

Man-in-the-middle attacks, such that a rogue entity cannot masquerade a device to the monitoring SaaS platform. A rogue entity similarly cannot masquerade as the monitoring SaaS platform to the device-installed monitoring agent. The on-boarding process of the described embodiments ensures that both parties are capable of verifying the identity of the opposite device/platform.

Maintain the integrity of transmitted messages, such that communication is secured at all times and is tamper proof Prevent replay attacks by ensuring a rogue entity cannot disrupt the service of an existing device.

Certain embodiments utilize unique workflows for implementing public-key cryptography solutions to prevent man-in-the-middle attacks, to prevent replay attacks, and to establish secure communication channels during a device on-boarding process—a process historically plagued by unsecure components that often expose IoT devices to potentially rogue access requests/attacks.

Embodiments of the present invention achieve, among other things, the following:

Build a system of trust for a user and devices associated with the user;

Only trusted users can manipulate the trusted devices once the device trust is established;

Untrusted users can view only certain aspects of information from the dashboard;

Establish an infrastructure and process for onboarding the user and the device into a Trusted platform and ecosystem, thereby enabling Trust as a Service (TaaS) for both the user and devices from the moment of factory inception;

Incorporate a process to establish and maintain Trust throughout the lifecycle of the device and track changes to the device during its lifecycle;

Removes the burden of technological complexity from the user or administrator;

Provides information via alerts and notifications, thereby to prevent overload of information.

The onboarding workflow described herein may be utilized for any user/customer (hereinafter referred to as user) desiring to deploy embodiments of the present invention and/or associated Trust as a Service (TaaS) platform functional units, which form a part of a specific Software as a Service (SaaS) configuration, supported via a computing platform having a computing configuration as discussed herein.

FIGS. 1-6 illustrate various components of a workflow for onboarding a device to a trusted ecosystem and platform according to one embodiment. These figures each provide an illustrative flowchart of a particular portion of an example workflow according to certain embodiments. At least certain portions of the example workflows are illustrated in additional detail in reference to FIG. 7.

According to certain embodiments, to use and benefit from embodiments of the present invention, either for a free trial or as a paying member, a user first registers on a host website, as shown in FIG. 1. The host website may be associated with the SaaS platform, and such a website may provide a splash screen or other information relevant to potential new users of the SaaS platform's trust services. As illustrated in FIG. 1, the registration process may encompass steps by which the user provides identifying data (e.g., a name, contact information (e.g., an email address; phone number; and/or the like), requested sign-in information (e.g., a username), a password, and/or the like. In certain embodiments, the user may additionally provide data indicative of a company, factory, or other entity for which various network-connected device (e.g., IoT device) trust is to be associated. It should be understood that a plurality of users may register to gain access to data relating to a single company, factory, entity, and/or the like.

Although FIG. 1 in particular illustrates steps for initiating a free trial for the user, it should be understood that registration need not be free, and accordingly a user may additionally provide payment information for access to the SaaS platform as well.

Upon registration of a new user, the SaaS platform may generate a user profile for the user, and may store various user-specific data in association with the user profile. Such user-specific data may associate a particular user with a particular company, factory, entity, and/or the like. Although not shown, it should be further understood that the SaaS platform may be configured to generate company/factory/entity profiles upon initiation of data relating to a new factory. Data relating to particular network-connected devices (e.g., IoT devices) monitored by the SaaS computing platform (and corresponding device-installed agent on the network-connected device) may be stored in association with the company/factory/entity profile, which may be accessed by individual users in accordance with access credentials stored in association with user profiles.

Figure 2:
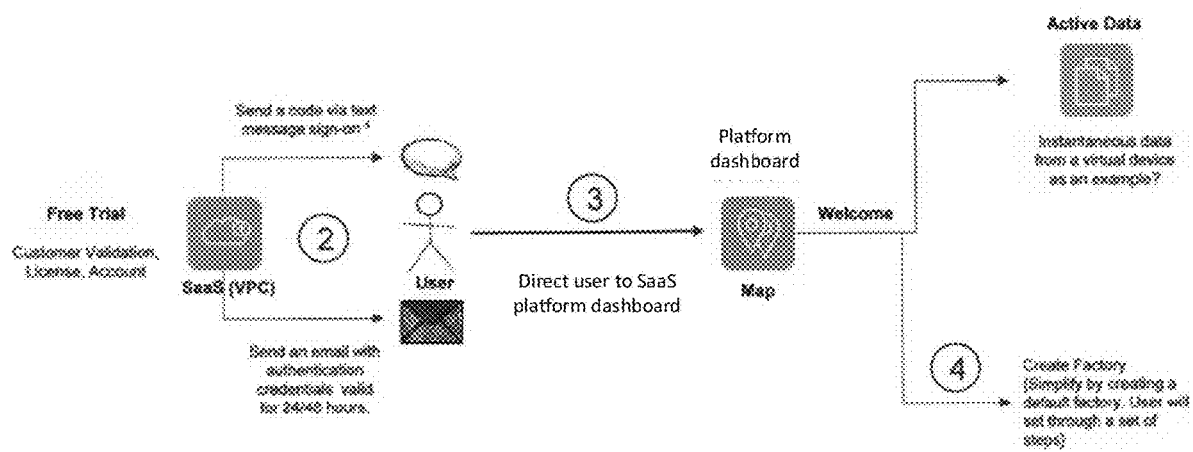

With reference again to the figures, FIG. 2 provides additional detail regarding the registration process for a new user. Such registration triggers a series of steps—many of which are associated with Software as a Service (SaaS) backend applications so as to hide the complexity of the processes from the user, as shown in FIG. 2. As noted above, such steps may encompass generation of a user profile, a company/factory/entity profile (if applicable), generation of a new platform dashboard for the new user, and/or one or more user identity confirmation steps, such as multi-factory authentication (e.g., using a user's email address and phone number to provide separate contact points for verifying the user's identity). Accordingly, the scripts running the website and backend SaaS application validates the user and provides the user with a code and an email link to sign into the dashboard created for the user, thereby creating Trust for the user.

After the user gains access to the dashboard, the next step is the creation of a connected-factory. To achieve this, the system may provide the user with pre-install 'tool-tips' that educates the user about the connectivity requirements in order to enable the user to complete the subsequent steps. Moreover, it should be understood that in certain embodiments, a user may have access to an already created company/factory/entity profile, in which case the user may be provided with options to add new devices, to remove existing devices, and/or to modify data associated with existing devices of the existing company/factory/entity profile. Specific steps for adding new devices to an existing factory are described in greater detail herein.

Figure 3:
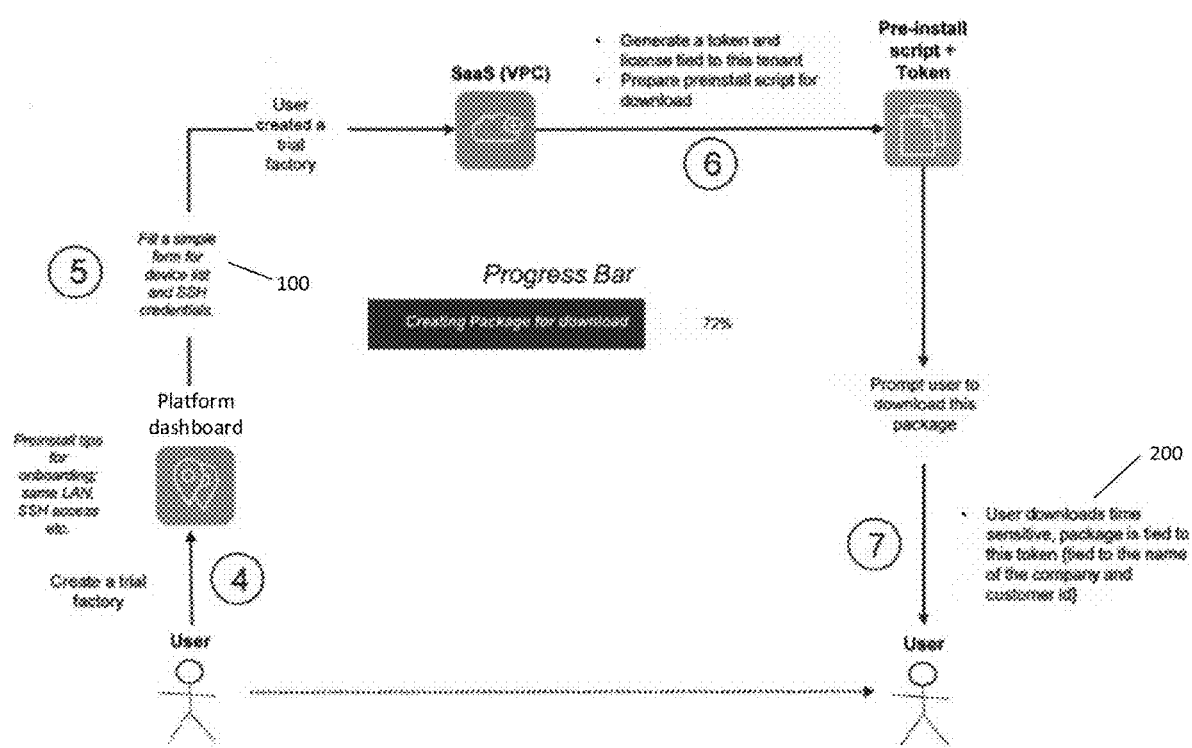

When generating a new company/factory/entity profile, a user fills out a form to specify the IP addresses (and/or other unique machine identifiers) and SSH credentials of the devices the user intends to connect to embodiments of the present invention. FIG. 3 provides greater detail regarding the process for generating data corresponding to a new company/factory/entity.

Figure 4:
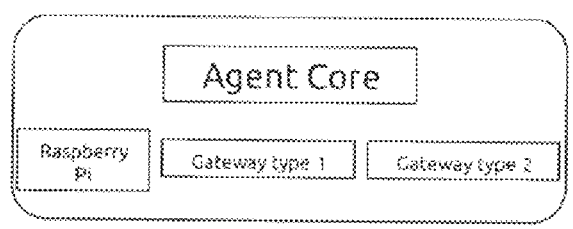

After the user fills in the form 100 (shown at step (5)) of FIG. 3, and clicks the 'submit' button, the backend SaaS application generates a tenant specific token and a relatively small script package (e.g., less than 5 MB in size) for download by the user. This step establishes a 'Trusted' connection between the user and the factory. The user downloads the script package to a laptop, a server 200, or another computing entity (shown at step (7)) that is connected the factory network where the devices are also connected. The user is provided with instructions on how to run the script which may be a one line/word command that can also be embedded in a graphical user interface. The script in turn launches a series of processes that log into (SSH) the devices and automatically perform the necessary functions in preparation for the agent download, as shown in FIG. 4. Detailed descriptions of example agents are provided in U.S. application Ser. No. 16/119,357 (filed Aug. 31, 2018); Ser. No. 16/119,269 (filed Aug. 31, 2018); and Ser. No. 16/236,170 filed Dec. 28, 2018) the contents of all of which are incorporated herein by reference in their entirety.

The pre-install package downloaded onto the user's laptop contains an executable script (e.g., an ansible script) configured to initiate the connections for the devices to be connected to agents and various other components of the embodiments of the present invention.

Figure 5:
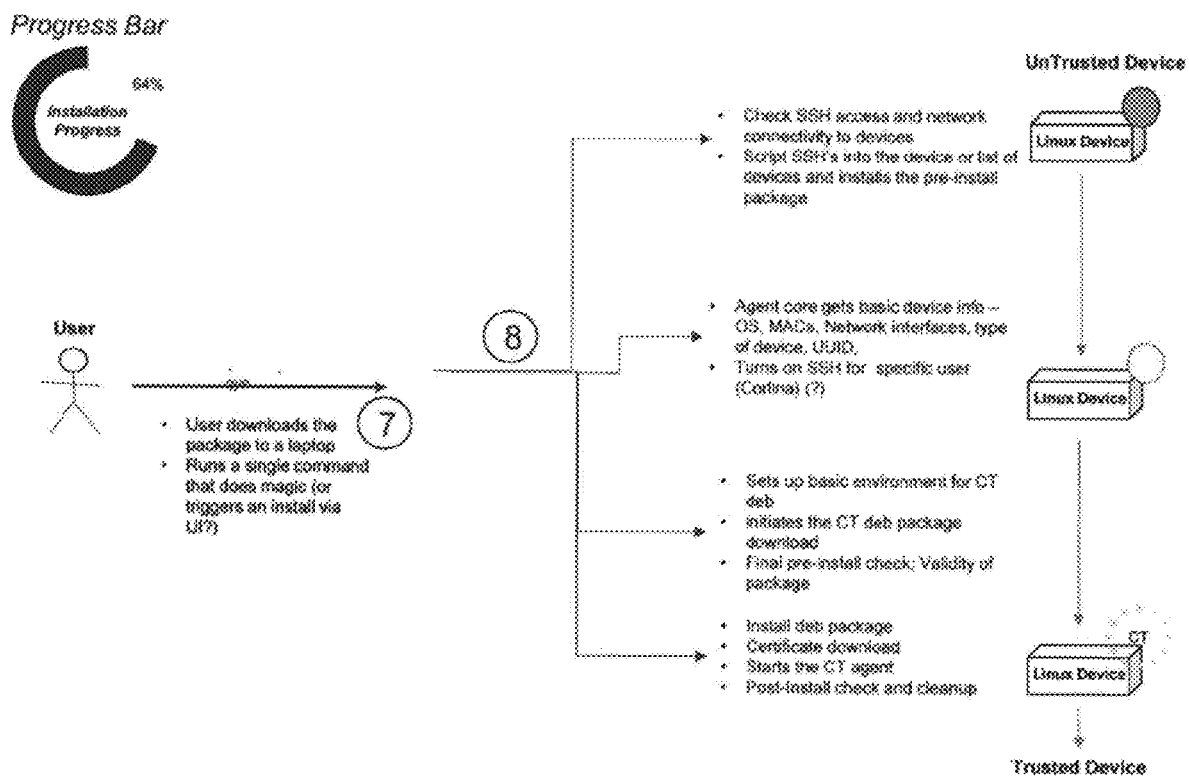
Figure 6:
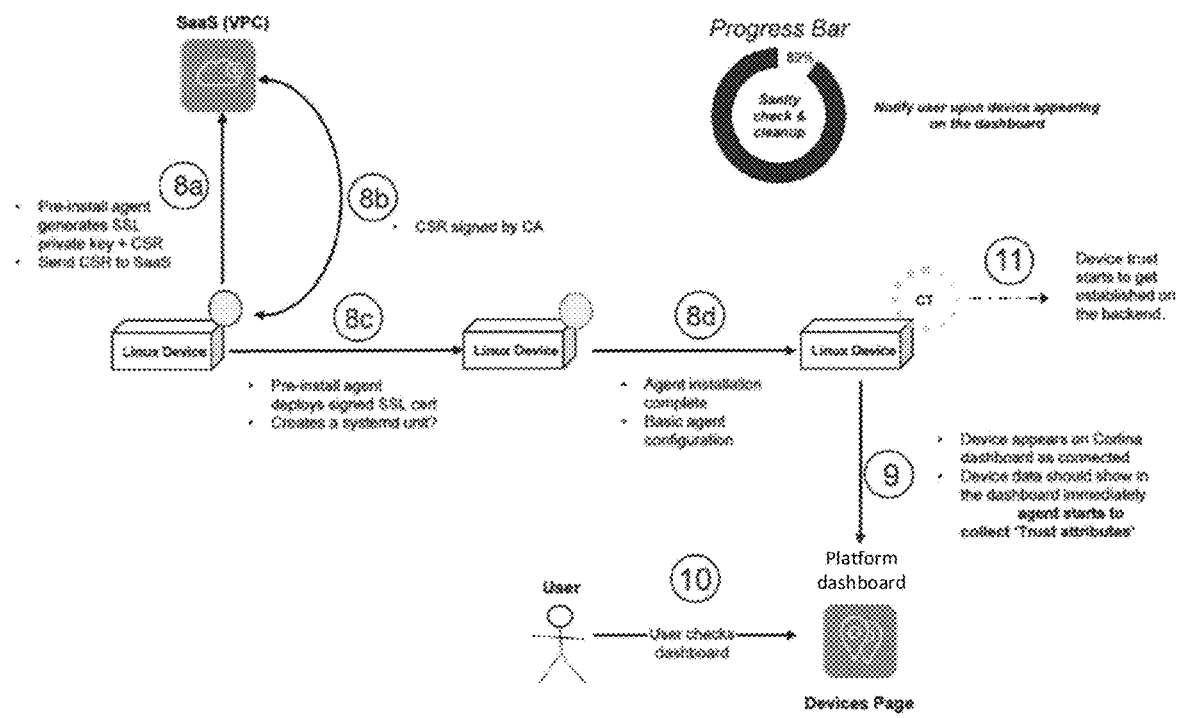

Once the user runs the command, an additional sequence of steps to onboard specific devices, as shown in FIGS. 5 and 6, execute. The command so initiated by the user, for example, on his laptop, triggers a script to execute a series of automated steps on each of the devices that are to be connected. The preinstall script will SSH into the device and copy over the agent core in a directory. The agent core performs preliminary investigation functions on the devices and its properties, as shown in FIG. 5. Among investigative functions performed by the agent core are the following:

Establishing connectivity to the SaaS Cloud in accordance with embodiments of the present invention;
Scoping the device type and parameters (e.g., CPU, Memory, Disk);
Identifying a machine identifier for the device;
Types of software processes or applications running (if any)
Types of connections/ports (e.g., USB, Serial)
Type of Operating system
Creation of a virtual environment for the agent installation
Checking package dependencies if any in the virtual environment
Starting a keepalive to the SaaS Cloud Referring to FIG. 5, step 8 shows incremental stages as the device goes from being untrusted to trusted. Pre-install script and the agent core establish Cloud connectivity (e.g., connection between the network-connected device and the SaaS computing platform), check the device type and status and downloads the relevant modules to run the full-fledged agent.

FIG. 6 shows more details that take place during step 8 of FIG. 5. Once the basic device scoping and Cloud connectivity is established, the agent core initiates a device-specific download of the rest of the agent software from the SaaS, in accordance with embodiments of the present invention. This may be a deb package that includes all relevant packages and may be installed in a virtual environment on the host device. This process ensures that the environment in which various embodiments of the present invention are adapted to operate is isolated from the rest of the system environment and applications. Once the deb package is installed, the agent core may perform a cleanup and start the rest of the agent processes. At this stage (11), the Trust Platform may start the process of creating a 'Trusted Device', in accordance with embodiments of the present invention.

Table I below further describes the names and actions that taken during steps 1-11 of FIGS. 1-6:

| STEP | STEP # | DESCRIPTION | USER TRUST STATUS | DEVICE TRUST STATUS |
| --- | --- | --- | --- | --- |
| User signup | 1 | Customer onboarding stage. User visits website and signs up | UNTRUSTED | UNTRUSTED |
| Customer onboarding. signup | 2 | Multi-factor authentication. For example, user receives an email with link and a code via cell/mobile phone. Start of the process of user authentication. | UNTRUSTED | UNTRUSTED |
| User onboarding. Email and code delivered to user. | 3 | User clicks on the email link and gets access to the tenant account on the dashboard. User is authenticated and is the starting point for the establishment of user trust. | UNTRUSTED | UNTRUSTED |
| User onboarding. Factory creation. | 4 | User creates a factory or uses the default factory which can be personalized later. User starts the process of creating a factory to add devices to this factory. | TRUSTED | UNTRUSTED |
| User onboarding. Prep stage for device onboarding. | 5 | User fills in a form with information about the devices. This is necessary device information to start the process of onboarding the devices. First step to building device trust. | TRUSTED | UNTRUSTED |

-continued

| STEP | STEP # | DESCRIPTION | USER TRUST STATUS | DEVICE TRUST STATUS |
|---|---|---|---|---|
| Trust Platform | 6 | Generate a token and pre-install software specifically for this 'trusted' user. | TRUSTED | UNTRUSTED |
| User onboarding. User downloads the pre-install package. | 7 | User is prompted to download the pre-install package which will help simplify device onboarding. | TRUSTED | UNTRUSTED |
| Device Onboarding. Launch pre-install script. | 8 | User launches pre-install script that then triggers the process of onboarding the devices in a fast and simple way. | TRUSTED | UNTRUSTED |
| Device Onboarding. Device shows up on the dashboard in the tenant's (user's) default factory. | 9 | Device connects to the SaaS and appears on the dashboard for the user to view. | TRUSTED | UNTRUSTED |
| User Onboarding. User views dashboard. | 10 | User is notified of the devices appearance on the dashboard. | TRUSTED | TRUSTED (LEVEL 0) |
| Device Trust establishment. | 11 | Agent starts to collect the device 'Trust attributes' from the device as soon as it is onboarded in steps 8/9. | TRUSTED | TRUSTED (LEVEL X) |

Although not shown in the Figures, following the completion of step 11, the agent continues to incrementally collect and report Trust attributes including device data, image, application software and device behavior, improving the device's trustworthiness level.

Device Connection and Onboarding Detail

Figure 7:
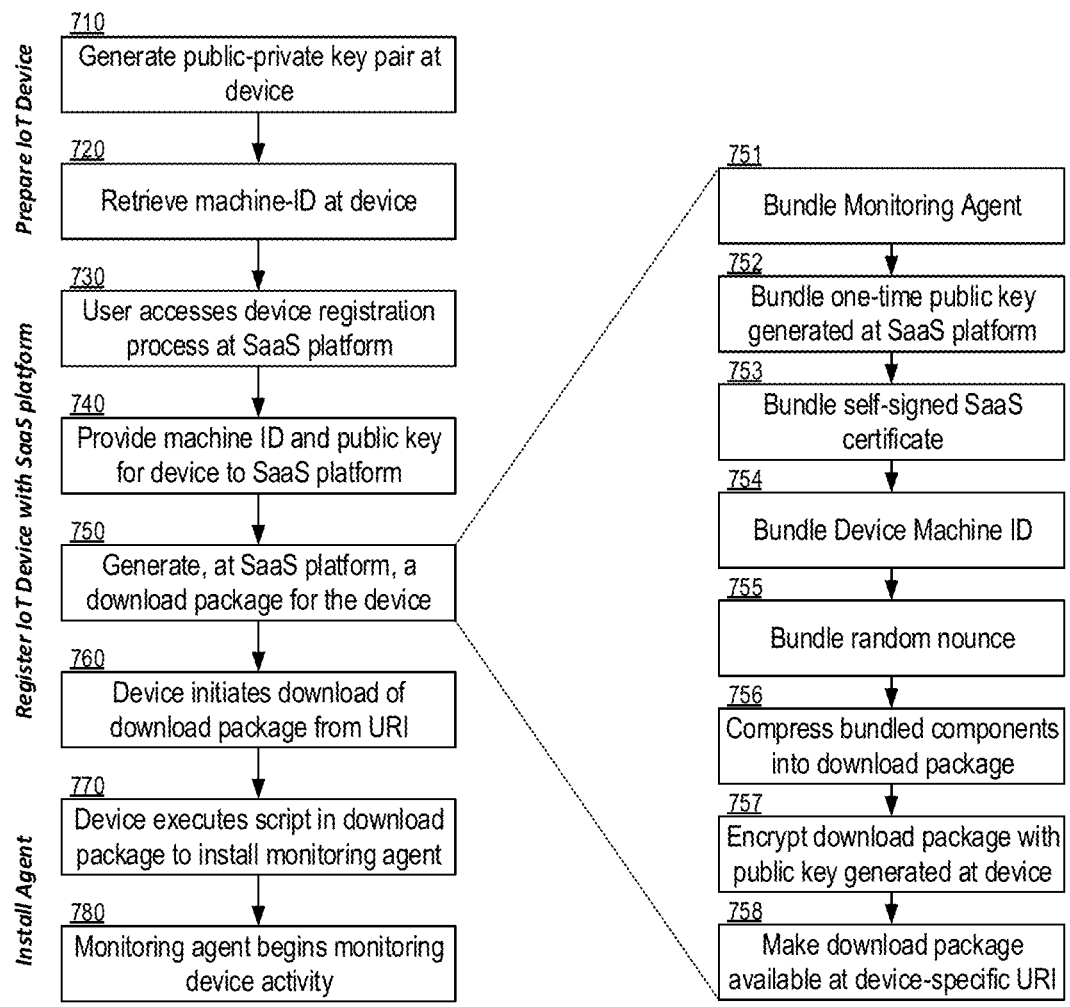
FIG. 7 shows various portions of a workflow for onboarding a device in accordance with one embodiment.

FIG. 7 provides additional detail regarding processes for preparing a device for connection with the SaaS platform and for ensuring connections between the device (specifically, the monitoring agent installed on the device) and the SaaS platform are secure. To ensure such security, the processes encompasses steps for preparing the IoT device for connection with the SaaS platform; for registering the IoT device with the SaaS platform; and for installing the monitoring agent on the IoT device while maintaining secure connectivity between the monitoring agent and the SaaS platform.

As illustrated in FIG. 7, and as mentioned above, preparing the IoT device encompasses steps for generating device data by generating a public-private key pair at the device and extracting a machine identifier unique to the particular device from the device, as illustrated at Blocks 710-720. Such steps may be performed manually in certain embodiments (e.g., a user may provide various command-line commands to the IoT device (e.g., from a connected separate computing device, such as a connected laptop or other computing entity). In other embodiments, the steps for generating a public-private key pair and for extracting a unique machine identifier from the device may be performed automatically (e.g., via an executable script installed to the device).

As discussed in greater detail herein, the public-private key pair is generated at the device to ensure that communications provided to the device (e.g., a download package configured specifically for the device) are only accessible to the requesting device. The public key is ultimately provided to the SaaS platform for encryption of the device-specific download package as discussed in greater detail herein, but the private key is maintained in confidence on the IoT device (e.g., using TPM to store the key locally at the IoT device), such that only the IoT device is capable of decrypting data (e.g., the download package) encrypted using the public key. Moreover, the machine ID may be provided to the SaaS platform for generation of the device-specific download package, which may be utilized by both the SaaS platform and the IoT device itself to ensure the proper download package is provided to the device. Such steps are discussed in greater detail herein.

To begin the device registration process, the user accesses the device registration process of the SaaS platform, as shown at Block 730. As discussed above, the device registration process may be accessed from a user dashboard provided from the SaaS platform for use by the user. Because a device separate from the IoT device is utilized to initiate the device registration process, further trust may be afforded to the device and the registration process in general. This effectively operates as a multi-factor authentication ensuring that the device itself is being registered only via an intentional registration request provided by a user having access to both the device and the company/factory/entity. However, it should be understood that in certain embodiments, the device registration process may be initiated from the device itself, for example, as a part of an automatically executing script initiated while preparing the IoT device for registration.

As illustrated at block 740, the user provides the device data, such as the unique machine ID and the public key generated by and for the IoT device to the SaaS platform. This data may be provided via manual user input (e.g., a user typing one or more alphanumeric strings into provided fields of a user interface accessible to the user dashboard and indicative of the machine ID and public key). In other embodiments, the data may be provided automatically, such as by transmitting the data from the IoT device itself to the SaaS platform. However, the latter embodiments may expose the IoT device to the potential for interception of the transmitted data unless secure transmission techniques are utilized to impede/prevent the likelihood of data interception.

As indicated at Block 750, the SaaS platform may thereafter generate a download package for the IoT device including a monitoring agent to establish a secure connection between the SaaS platform and the monitoring agent to be installed on the IoT device. Blocks 751-758 provide additional detail of the data included within the generated download package and the mechanism by which the download package is generated.

As shown at Block 751, a monitoring agent (which may be selected from a plurality of available executable monitoring agents based on characteristics of the IoT device, for example, as identified from the unique machine ID or other characteristics of the device) is bundled into the download package. As reflected at Block 752, the SaaS platform generates a public-private key pair, and includes the public key in the download package. This public-private key pair may be utilized to establish a secure connection between the monitoring agent as installed on the IoT device and the SaaS platform for secure data transmission between the monitoring agent and the SaaS platform. The private key may be stored locally at the SaaS platform for later decryption of data provided to the SaaS platform from the monitoring agent installed on the IoT device. Moreover, a self-signed SaaS certificate may be bundled into the download package, as indicated at Block 753. The self-signed SaaS certificate enables the monitoring agent to validate the identity of the SaaS platform during later data transmissions from the SaaS platform to the monitoring agent.

As shown at Block 754, the SaaS platform places the unique machine ID into the download bundle, thereby enabling the IoT device to verify that the provided download bundle is provided for the correct IoT device. Further, a randomly generated nounce may be included within the bundle. This randomly generated nounce may be a one-time use value to impede/prevent repeated usage attacks on the SaaS platform and/or IoT device. Once the randomly generated nounce is used to verify a communication from the SaaS platform, it is no longer valid, and therefore later attempts to utilize the same randomly generated nounce will be deemed invalid.

As shown at block 756, the generated download package is compressed for transmission to the IoT device, and the compressed download package is encrypted utilizing the public key provided by the IoT device during IoT preparation (Block 710), as shown at Block 757. Moreover, the SaaS platform then makes the download package available to the IoT device at a device-specific URI accessible to the IoT. The URI points to a download script including the generated device-specific download package. The download script causes automatic transmission of the download script to a device accessing the specific URI.

With reference to Block 760, the IoT device accesses the device-specific URI generated by the SaaS platform to download the download package. Accessing the device-specific URI may be performed manually, for example, by a user providing executable instructions (e.g., via command-line) to the IoT device to access the device-specific URI. In certain embodiments, accessing the device-specific URI may be performed manually, for example, in accordance with a script executing on the device. In the latter embodiments, the device-specific URI may be generated in accordance with a predictable algorithm, such that the script executing on the device is enabled to ascertain the appropriate device-specific URI for the device.

Upon accessing the device-specific URI, the SaaS platform (or a third party hosting service hosting the download package) transmits the download package to the IoT device for storage and execution thereon. The IoT device then utilizes the private key stored locally thereon to decrypt the download package. Because the download package was encrypted using a device-specific public key, the device is afforded with a level of trust in the download package as being from the intended SaaS platform. Moreover, only the intended device can decrypt the package, thereby affording the SaaS platform a level of trust that the monitoring agent will in fact only be installed on the intended device, because only the intended device is capable of decrypting the download package.

Once the download package is decrypted, the device executes an installation script within the download package to install the monitoring agent on the IoT device, as indicated at Block 770. As a part of the installation process, the IoT device copies the nounce, one-time public key, and self-signed SaaS platform certificate to a specific storage location and installs the monitoring agent.

The monitoring agent then uses the public key and SaaS platform certificate to establish a secure connection with the SaaS platform and to verify the identity of the SaaS platform. The bundling of the one-time self-signed SaaS platform certificate ensures the monitoring agent can verify the identity of the SaaS platform. Since a unique certificate is generated for each device download, the resulting secure connection between the monitoring agent and the SaaS platform is robust and resistant to replay attacks. In certain embodiments, the monitoring agent performs a "call-home" message transmission with the device's unique machine-ID along with a nounce value reflecting the nounce included with the download package to establish a secure connection between the SaaS platform and the monitoring agent.

As shown at Block 780, the monitoring agent thereafter begins monitoring the IoT device and periodically transmits parameters used for monitoring the device and its environment to the SaaS platform. These parameters may be utilized by the SaaS platform to generate a trust score for the IoT device.

In accordance with certain embodiments, the SaaS platform verifies the authenticity of the device by: verifying the nounce value passed by the monitoring agent by comparing the nounce transmitted from the monitoring agent against the nounce provided to the IoT device as a part on the download package. Moreover, the SaaS platform verifies that the unique machine ID matches with the unique machine ID provided during initial registration.

Once the initial trust has been established, the SaaS platform uses the parameters observed by the monitoring agent to monitor and determine the trust of the IoT device.

If a rogue entity tries to replay the call-home message, the SaaS platform would detect the attempted unauthorized access by checking the nounce. If the nounce has been previously used and verified, the attempted registration fails.

The foregoing steps for onboarding an IoT device enables the SaaS platform to ensure trust without mandating monitoring agents to be pre-installed on IoT devices during IoT device manufacturing. The process thereby enables the establishment of trust with an IoT device even after the device has been manufactured.

System Components

Figure 8:
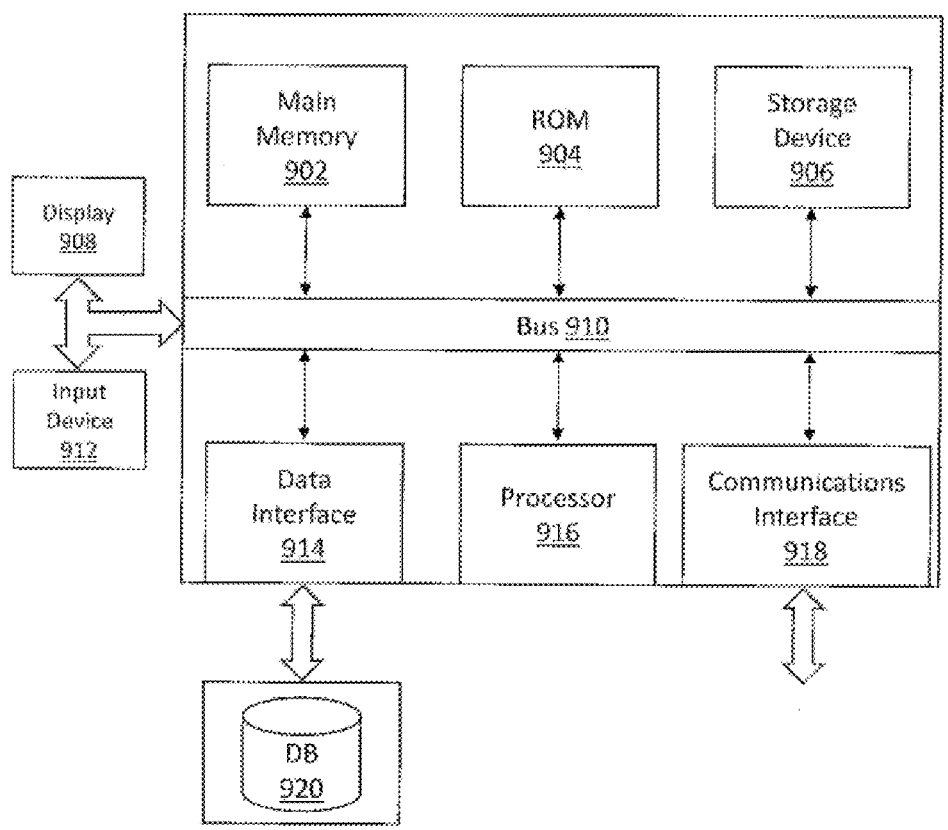
FIG. 8 is a block diagram of a computer system, according to an embodiment of the present invention.

FIG. 8 shows various components of a computation/communication system in which various aspects of the present invention may be embodied.

Embodiments of the present invention may be implemented in various ways, including as computer program products that comprise articles of manufacture. Such such computer program products may include one or more software components including, for example, software objects, methods, data structures, and/or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of a data structure, apparatus, system, computing device, computing entity, and/or the like executing instructions stored on a computer-readable storage medium to perform certain steps, operations, or processes. Thus, embodiments of the present invention may also take the form of an entirely hardware embodiment, an entirely computer program product embodiment, and/or an embodiment that comprises combination of computer program products and hardware performing certain steps, operations, or processes.

Embodiments of the present invention are described herein with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps, operations, or processes specified in the block diagrams and flowchart illustrations. Accordingly, the block diagrams and flowchart illustrations support various combinations of embodiments for performing the specified instructions, operations, or steps.

With reference again to FIG. 8, the computation/communication system may encompass, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As shown in FIG. 8, in one embodiment, the computation/communication system may include or be in communication with one or more processors 916 (also referred to as processing elements, processing circuitry, and/or similar terms used herein interchangeably) that communicate with other elements within the computation/communication system via a bus 910, for example. As will be understood, the processors 916 may be embodied in a number of different ways. For example, the processors 916 may be embodied as one or more complex programmable logic devices (CPLDs), microprocessors, multi-core processors, coprocessing entities, application-specific instruction-set processors (ASIPs), and/or controllers. Further, the processors 916 may be embodied as one or more other processing devices or circuitry. The term circuitry may refer to an entirely hardware embodiment or a combination of hardware and computer program products. Thus, the processors 916 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processors 916 may be configured for a particular use or configured to execute instructions stored in volatile or non-volatile media or otherwise accessible to the processors 916. As such, whether configured by hardware or computer program products, or by a combination thereof, the processing element 205 may be capable of performing steps, operations, or processes according to embodiments of the present invention when configured accordingly.

In one embodiment, the computation/communication system may further include or be in communication with a non-volatile media (also referred to as non-volatile storage, memory, memory storage, memory circuitry and/or similar terms used herein interchangeably). In one embodiment, the non-volatile storage or memory may include one or more non-volatile storage devices or memory media, such as a main memory 902, ROM 904, storage device 906, and/or the like. Various of these storage media may be embodied as hard disks, PROM, EPROM, EEPROM, flash memory, MMCs, SD memory cards, Memory Sticks, CBRAM, PRAM, FeRAM, RRAM, SONOS, racetrack memory, and/ or the like. As will be recognized, the non-volatile storage device 906 may store databases, database instances, database management system entities, data, applications, programs, program modules, scripts, source code, object code, byte code, compiled code, interpreted code, machine code, executable instructions, and/or the like. The term database, database instance, database management system entity, and/or similar terms used herein interchangeably may refer to a structured collection of records or information/data that may be stored in a computer-readable storage medium, such as via a relational database, hierarchical database, and/or network database.

Storage device 906 may also be embodied as a data storage device or devices, as a separate database server or servers, or as a combination of data storage devices and separate database servers. Further, in some embodiments, storage device 906 may be embodied as a distributed repository such that some of the stored data may be stored centrally in a location within the system and other data may be stored in one or more remote locations. Alternatively, in some embodiments, the distributed repository may be distributed over a plurality of remote storage locations only. As a person of ordinary skill in the art would recognize, the data required for the operation of the analytic computing entity may also be partially stored in the cloud data storage system and partially stored in a locally maintained data storage system.

Moreover, the computation/communication system may further comprise a data interface 914, which may enable the computation/communication system to communicate with one or more separate databases 920.

As indicated, in one embodiment, the computation/communication system may also include one or more network and/or communications interfaces 918 for communicating with various computing entities, such as by communicating data, content, information, and/or similar terms used herein interchangeably that can be transmitted, received, operated on, processed, displayed, stored, and/or the like. For instance, the computation/communication system may communicate with one or more IoT devices, such as various sensors, manufacturing devices, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the computation/communication system may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, and/or any other wireless protocol. The computation/communication system may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

The computation/communication system may also comprise and/or may be in communication with one or more user interface devices comprising one or more user input/output interfaces (e.g., a display 908 and/or speaker/speaker driver and a touch screen, keyboard, mouse, and/or microphone). For example, the output interface may be configured to provide an application, browser, user interface, dashboard, webpage, and/or similar words used herein interchangeably executing on and/or accessible via the computation/communication system to cause display or audible presentation of information/data and for user interaction therewith via one or more user input interfaces. The input device 912 can comprise any of a number of devices allowing computation/communication system to receive data, such as a keypad (hard or soft), a touch display, voice/speech or motion interfaces, scanners, readers, or other input device. In embodiments including a keypad 318, the keypad can include (or cause display of) the conventional numeric (0-9) and related keys (#, *), and other keys used for operating the computation/communication system and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the computation/communication system can collect information/data, user interaction/input, and/or the like.

As will be appreciated, one or more of the computation/communication system's components may be located remotely from other computing system components, such as in a distributed system. Furthermore, one or more of the components may be aggregated and additional components performing functions described herein may be included in the analytic computing entity 20. Thus, the analytic computing entity 20 can be adapted to accommodate a variety of needs and circumstances.

CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

As an example, although the foregoing onboarding process is discussed in specific reference to establishing a secure communication connection between a SaaS computing platform and IoT devices utilized in a manufacturing or other factory environment, it should be understood that the foregoing processes may be utilized for establishing a trusted connection among a centralized computing platform and one or more edge-located, network-connected devices, regardless of the environment or intended usage of the centralized computing platform and/or the one or more edge-located computing devices.

That which is claimed:

1. A computing platform for onboarding a device into a trusted connected system by establishing a secure communication pathway with the device, the computing platform comprising:
   one or more memory storage areas; and
   one or more processors collectively configured to:
      receive, over a network, device data comprising a unique machine identifier corresponding to the device and a first public cryptography key generated by the device in response to a command provided to the device from an external device; and
      generate a device-specific installation package comprising:
         a second public cryptography key generated by the one or more processors as a part of a second public-private cryptography key pair;
         the unique machine identifier;
         a device agent, wherein the device agent comprises a monitoring agent which periodically transmits parameters used for monitoring trust of the device and device environment to the computing platform;
         a one-time use nounce; and
         an executable installation script configured to cause the device to install the device agent and to initiate a secure communication connection between the device and the computing platform by passing a message encrypted with the second public cryptography key back to the computing platform, wherein the message comprises the one-time use nounce;
      encrypt the device-specific installation package via the first public cryptography key;
      provide the device-specific installation package to the device; and
      establish a secure communication pathway with the device upon receipt of the encrypted message from the device at least in part by:
         comparing a nounce value from the monitoring agent included within the encrypted message received from the device against the one-time use nounce included within the device-specific installation package; and
         upon determining a match between the nounce value and the one-time use nounce, establish the secure communication pathway with the device and invalidate the one-time use nounce.

2. The computing platform of claim 1, wherein establishing a secure communication pathway comprises:
   decrypting the encrypted message received from the device using a private cryptography key of the second public-private cryptography key pair; and
   upon verifying contents of the encrypted message received from the device, establishing the secure communication pathway.

3. The computing platform of claim 1, wherein receiving device data comprises receiving manual input provided by a user via a platform dashboard user interface.

4. The computing platform of claim 1, wherein receiving device data comprises receiving device data correlated with an untrusted device; and wherein establishing a secure communication pathway with the device converts the untrusted device into a trusted device.

5. The computing platform of claim 1, wherein providing the device-specific installation package to the device comprises:
   generating a device-specific URI accessible by the device via a network; and
   pointing the device-specific URI to a download script causing the device to download the device-specific installation package upon accessing the device-specific URI.

6. The computing platform of claim 1, wherein the one or more processors are further configured to generate a self-signed platform certificate for the device; and wherein the device-specific installation package further comprises the self-signed platform certificate for validating an identity of the computing platform at the device.

7. The computing platform of claim 1, wherein generating the device-specific installation package further comprises determining whether the device is capable of maintaining a trusted connection between the device agent and the computing platform based at least in part on output of an executable pre-install script executing on the external device.

8. A computer-implemented method for onboarding a device into a trusted connected system by establishing a secure communication pathway between the device and a computing platform, the method comprising:
   receiving, over a network, device data comprising a unique machine identifier corresponding to the device and a first public cryptography key generated by the device in response to a command provided to the device from an external device;
   generating a second public-private cryptography key pair comprising a second public cryptography key; and
   generating a device-specific installation package comprising:
      the second public cryptography key;
      the unique machine identifier;
      a device agent, wherein the device agent comprises a monitoring agent which periodically transmits parameters used for monitoring trust of the device and device environment to the computing platform;
      a one-time use nounce; and
      an executable installation script configured to cause the device to install the device agent and to initiate a secure communication connection between the device and the computing platform by passing a message encrypted with the second public cryptography key back to the computing platform, wherein the message comprises the one-time use nounce;
   encrypting the device-specific installation package via the first public cryptography key;
   providing the device-specific installation package to the device; and
      establishing a secure communication pathway with the device upon receipt of the encrypted message from the device at least in part by:
         comparing a nounce value from the monitoring agent included within the encrypted message received from the device against the one-time use nounce included within the device-specific installation package; and
         upon determining a match between the nounce value and the one-time use nounce, establish the secure communication pathway with the device and invalidate the one-time use nounce.

9. The computer-implemented method of claim 8, wherein establishing a secure communication pathway comprises:
   decrypting the encrypted message received from the device using a private cryptography key of the second public-private cryptography key pair; and
   upon verifying contents of the encrypted message received from the device, establishing the secure communication pathway.

10. The computer-implemented method of claim 8, wherein receiving device data comprises receiving manual input provided by a user via a platform dashboard.

11. The computer-implemented method of claim 8, wherein receiving device data comprises receiving device data correlated with an untrusted device; and wherein establishing a secure communication pathway with the device converts the untrusted device into a trusted device.

12. The computer-implemented method of claim 8, wherein providing the device-specific installation package to the device comprises:
   generating a device-specific URI accessible by the device via a network; and
   pointing the device-specific URI to a download script causing the device to download the device-specific installation package upon accessing the device-specific URI.

13. The computer-implemented method of claim 8, further comprising: generating a self-signed platform certificate for the device; and wherein the device-specific installation package further comprises the self-signed platform certificate.

* * * * *